Dec. 31, 1963

J. M. HOOTON 3,115,935

WELL DEVICE

Filed March 18, 1960

5 Sheets-Sheet 1

INVENTOR.
JEFFERSON M. HOOTON
BY
McMorrow, Berman & Davidson
ATTORNEYS

Dec. 31, 1963 J. M. HOOTON 3,115,935
WELL DEVICE
Filed March 18, 1960 5 Sheets-Sheet 2

INVENTOR.
JEFFERSON M. HOOTON
BY
McMorrow, Berman & Davidson
ATTORNEYS

Dec. 31, 1963 J. M. HOOTON 3,115,935

WELL DEVICE

Filed March 18, 1960 5 Sheets-Sheet 3

INVENTOR.
JEFFERSON M. HOOTON
BY
McMorrow, Berman + Davidson
ATTORNEYS

WELL DEVICE

Filed March 18, 1960 5 Sheets-Sheet 4

INVENTOR.
JEFFERSON M. HOOTON
BY
McMorrow, Berman & Davidson
ATTORNEYS

INVENTOR.
JEFFERSON M. HOOTON
BY
McMorrow, Berman & Davidson
ATTORNEYS 3,115,935

United States Patent Office

Patented Dec. 31, 1963

3,115,935

WELL DEVICE

Jefferson M. Hooton, 5505 Jessamine St., Houston 36, Tex.

Filed Mar. 18, 1960, Ser. No. 15,891
3 Claims. (Cl. 166—117.6)

The present invention relates to a new and useful improvement in a well device.

In the drilling of a well, particularly an oil well, it is frequently desirable to close the well bore with a permanent type of well plug which cannot be removed from the well bore after it is installed. Such a device is frequently used with a whipstock employed to deflect the well bit or drill which is subsequently lowered into the bore.

An object of the present invention is to provide an improved well device which may be readily lowered into a well bore and anchored at a desired depth, such device being adapted to be employed as a well plug or whipstock to close the bore of the well.

Another object of the present invention is to provide a well plug or device having normally retracted anchoring members expandable into the wall of the bore in response to hand actuable means on the surface of the earth.

A further object of the present invention is to provide an improved well device having expandable members for anchoring the device in the well bore, the members being actuable by hydraulic, pneumatic, explosive, or mechanical means.

These and other objects and advantages of the present invention will be fully apparent from the following description when taken in conjunction with the annexed drawings, in which.

Referring in greater detail to the drawings in which like numerals indicate like parts throughout the several views, and with particular reference to FIGURES 1 to 7, inclusive, the well device of the present invention comprises an upstanding elongated whipstock or tapered body 22 and an elongated cylinder 24 positioned below and in vertical alignment with respect to the body 22 and dependingly supported from the body 22. The invention provides expandable locking means in the form of prong elements 26 and 28 arranged in pairs and mounted within the cylinder so as to move or swing outwardly into locking position with the free ends buried in the wall of a well bore, as at 30 in FIGURE 2.

Figures 3, 4, 5:
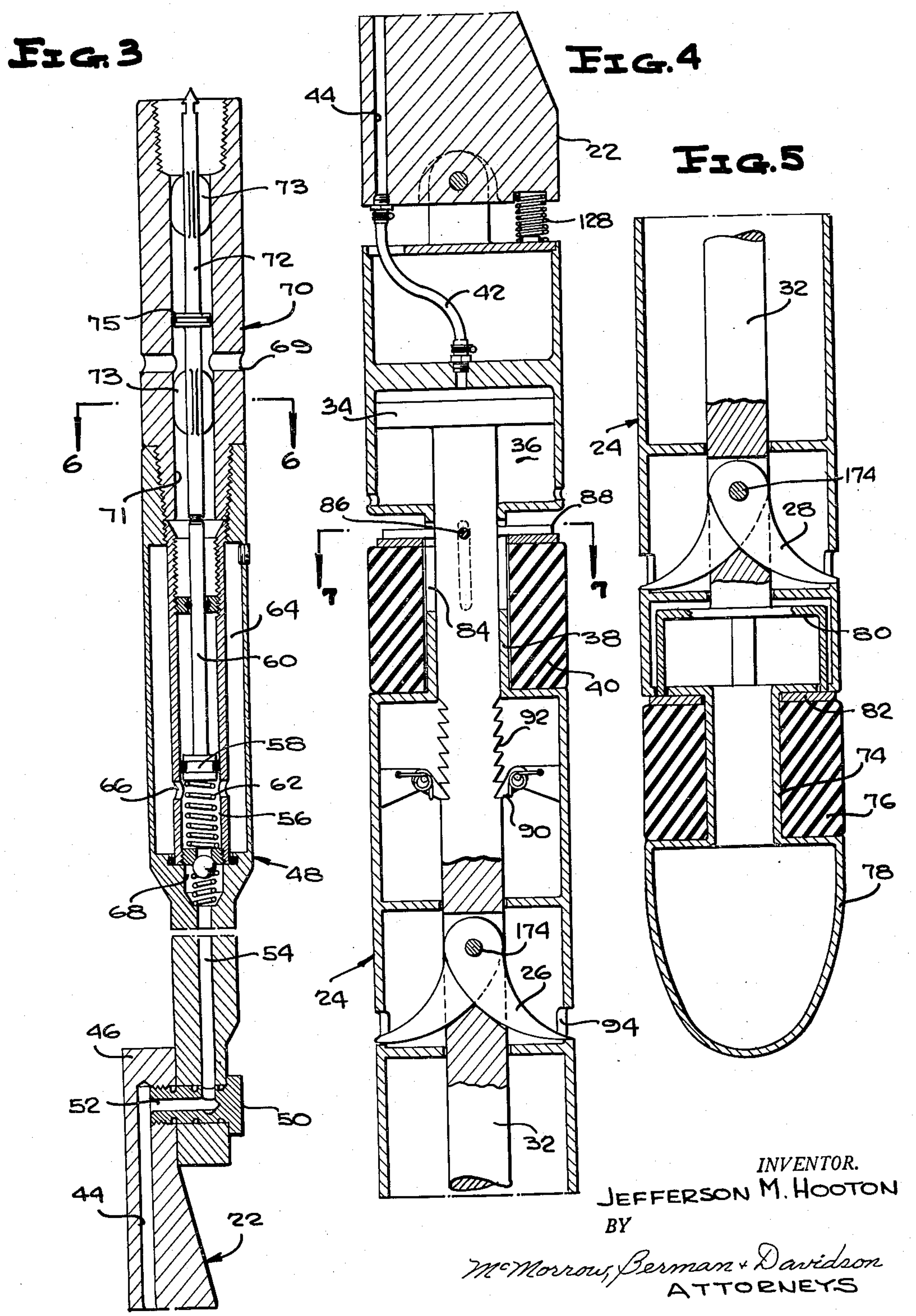
FIGURE 3 is a view on an enlarged scale, taken on the line 3—3 of FIGURE 1.
FIGURE 4 is a view on an enlarged scale, taken on the line 4—4 of FIGURE 1.
FIGURE 5 is a view on an enlarged scale, taken on the line 5—5 of FIGURE 1.

The invention provides an operator element or an elongated actuator 32, FIGURES 4 and 5, which extends longitudinally of and within the cylinder 24 and to which the pairs of prong elements 26 and 28 are pivotally connected as at 174, the element or actuator 32 being operable to expand the locking means or prong elements 26 and 28 to the locking position from the normally retracted position. The actuating means includes a piston on one end of the operator element 32, the piston being shown in FIGURE 4 and designated by the numeral 34.

A closed chamber, as at 36 in FIGURE 4, encompasses the piston 34 and fluid pressure means is injectable under pressure into the chamber 36 so as to impose a driving force upon the piston 34.

The chamber 36 is formed as an extension on the upper end of the cylinder 24. It is connected to the cylinder 24 by a reduced portion or sleeve 38 about which is circumposed a collar 40 fabricated of a resilient and expandable material such as rubber or the like.

A flexible conduit 42 connects the chamber 36 on the upper side of the piston 34 with a bore 44 extending longitudinally through the body 22 and terminating at a point spaced inwardly from the upper end of the body 22, as shown in FIGURE 3.

On the upper end portion or neck 46 of the body 22 is attached the lower end portion of a tool 48. The tool 48 is connected by a frangible connector 50 having a bore 52 therein connected in communication with the upper end of the bore 54. Extending upwardly from the lower end of the tool 48 is a bore 54 having its lower end connected in communication with the bore 52 and terminating in a pump chamber 56 provided in the tool 48. A piston 58 is slidably mounted within the chamber 56 and is attached to the lower end of a rod 60. A spring 62 within the chamber 56 biases the piston 58 to the limit of its upward movement. Surrounding the chamber 56 is a reservoir 64 having ports 66 in communication with the chamber 56. A normally closed check valve 68 is arranged at the lower end of the chamber 56 and serves to prevent flow of hydraulic fluid out of the bore 54 back into the chamber 56.

To the upper end of the tool 48, commonly called in the oil industry a setting tool, is secured another tool 70 known as a circulating sub.

A sleeve 74 is connected to the lower end of the cylinder 24 and another collar 76 is circumposed about the sleeve 74. The collar 76 is formed of resilient and expandable material, identical to the material of the collar 40. An anchor section 78 is dependingly carried on the lower end of the sleeve 74. The lower end of the operator element 32 carries a spider member 80 to which is attached an abutment means or annular member 82 which extends transversely of the operator element or actuator 32 and which presses against the upper end of the collar 76. The sleeve 38 is provided with slots 84, as in FIGURE 4, through which project transversely an abutment means or a plurality of radially arranged pins 86 which rest upon another annular member 88 bearing against the upper end of the collar 40.

Figure 1:
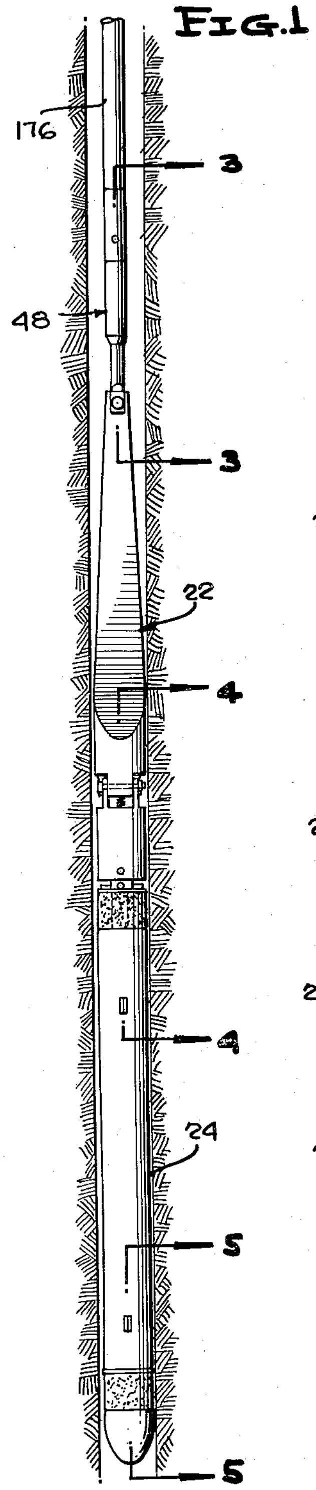
FIGURE 1 is a view of a well bore with the device of the present invention installed therein, prior to operation of the expandable locking means.
Figure 2:
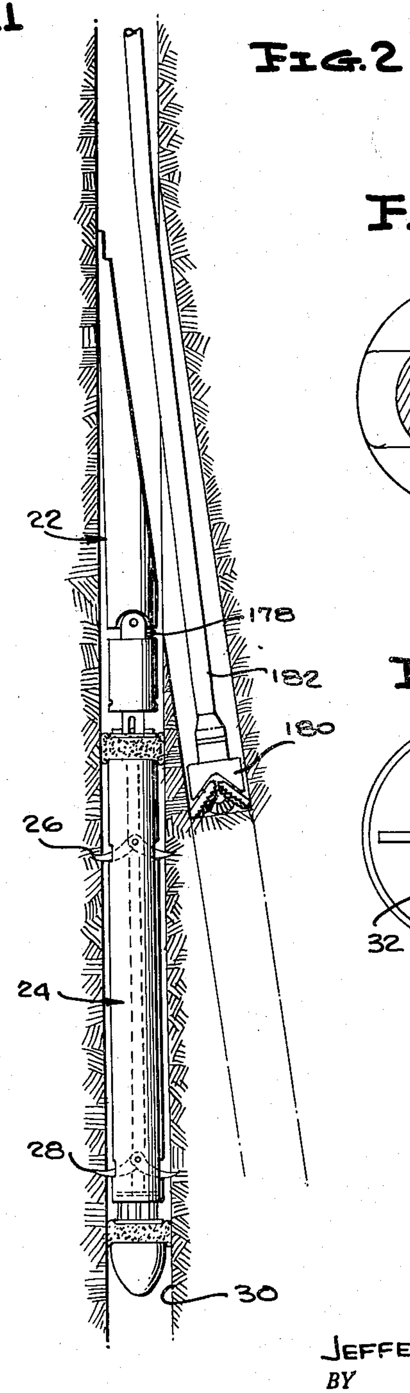
FIGURE 2 is a view of the device, shown removed from the placing tool or well pipe string, as viewed the side, showing the locking means in expanded condition and showing a well drill deflected by the whipstock portion of the device.
Figure 6:
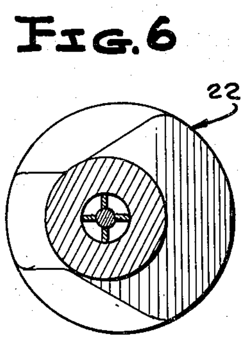
FIGURE 6 is a view on an enlarged scale, taken on the line 6—6 of FIGURE 3.
Figure 7:
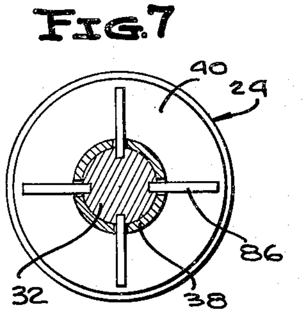
FIGURE 7 is a view taken on the line 7—7 of FIGURE 4.

Upon application of hydraulic pressure to the piston 34, the operator element 32 is shifted downwardly so that the collars 40 and 76 are spread outwardly, as in FIGURE 2.

Within the cylinder 24 are spaced dogs 90 engageable with ratchet teeth 92 on the element 32 for holding the element 32 in its position of downward movement in which the prong elements 26 and 28 are driven out of the cylinder 24 through the slots 94 provided for them.

Figures 8, 9, 10, 11:
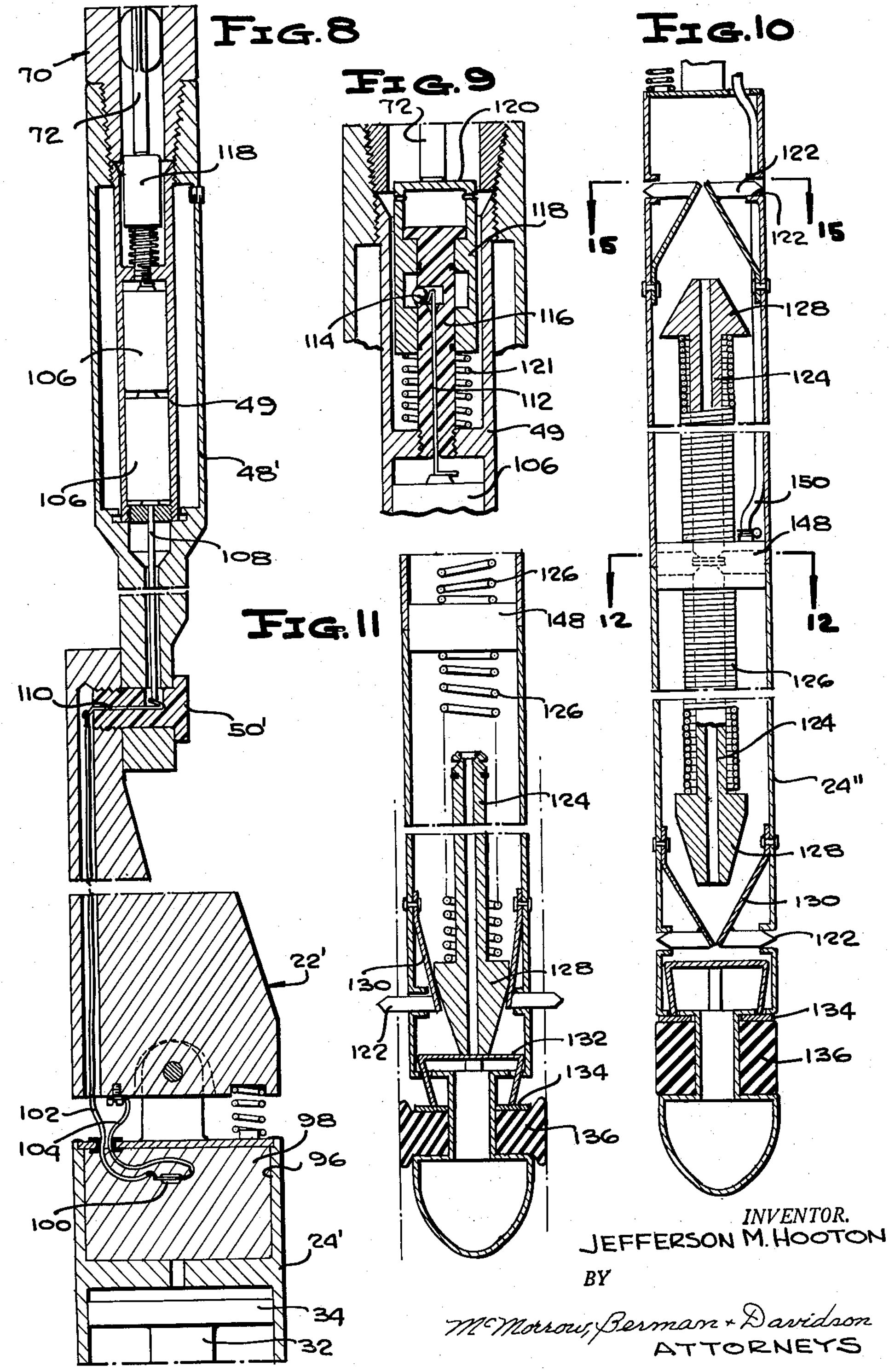
FIGURE 8 is a view in section of a modified form of the device according to the present invention.
FIGURE 9 is a view on an enlarged scale, a portion of the device shown in FIGURE 8.
FIGURE 10 is another view in section of a further modified form of the device according to the present invention, shown in cocked condition.
FIGURE 11 is a fragmentary view of the assembly shown in FIGURE 10, showing the device in operative or set condition.

With reference to FIGURES 8 and 9, a modified form of the invention is shown in which the cylinder 24′ is provided with a closed chamber 96 in its upper end, the chamber 96 containing a charge of explosive material, as at 98 in FIGURE 8.

An electrically operable detonator 100 is embedded in the material 98 or positioned adjacent thereto, as found practical. Wires 102 and 104 connect the detonator 100 to the shell of a battery 106 carried in a tool 48′, and to the body 22′ which is in supporting relation with respect to the cylinder 24′. The tool 48′ is connected to the upper end portion of the body 22′ by means of a frangible connector 50′.

Two batteries 106 are shown connected in series, although more batteries may be employed or a single battery employed as found practical. If desired, a transformer coil or charging condenser may be added to the batteries 106, to increase the electric current to the detonator 100.

A rigid conductive element 108 extends from the lower battery 106 to the connector 50′ which has another conductive element 110 extending therethrough having one end connected to the element 108 and the other end connected to the upper end of the wire 102.

In FIGURE 9, it will be seen that the upper battery 106 has its central electrode terminal connected by a conductive element 112 which has its upper end connected to a conductive bead 114 projecting out of a slot provided in an insulating support 116. A sleeve 118 is circumposed about the support 116 and is electrically conductive. The sleeve 118 has a closed end 120 against which abuts the lower end of the rod 72 of the circulating sub or tool 70.

A spring 121 biases the sleeve 118 to the upward position in which the bead 114 is out of electrical contact with the sleeve 118. Upon downward movement of the sleeve 118 responsive to pressure applied to the upper end, the circuit to the detonator 100 is closed and the material 98 is exploded.

The modified form of the invention shown in FIGURES 8 and 9 employs the piston 34, operator element 32, and the aforesaid locking means shown in FIGURES 1 to 7, inclusive.

In FIGURES 10 and 11, another modified form of the invention is shown in which neither hydraulic fluid pressure nor pneumatic pressure is employed but spring pressure applying means is employed to drive prong elements 122 outwardly of the cylinder 24″ into anchoring engagement with the wall of the well bore.

The spring pressure applying means includes a spring-loaded operator element 124 having a coil spring 126 wound thereabout. A wedge element 128 is carried on one end of the element 124 and is engageable when the loaded spring 126 is released with strap members 130 which have their one ends anchored to the wall of the cylinder 24″ and their other ends secured to the inner ends of the prong elements 122.

When the wedge element 128 is in the projected position, as shown in FIGURE 11, the free end thereof abuts against the spider 132 which is connected to an annular member 134 on the upper end of a collar 136, the collar being formed of the same material previously described with reference to the collars 40 and 76.

Figure 12:
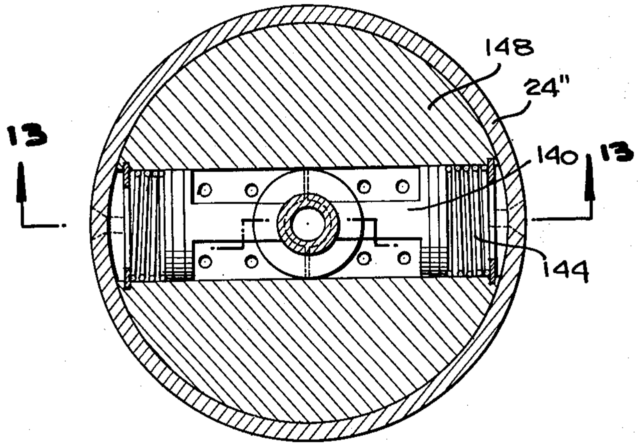
FIGURE 12 is a view on an enlarged scale, taken on the line 12—12 of FIGURE 10.
Figure 14:
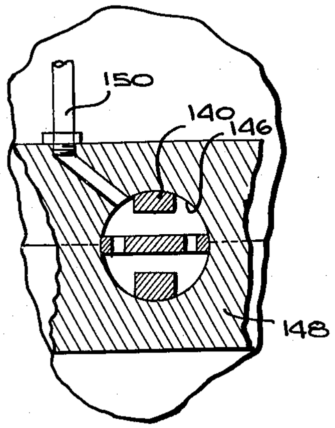
FIGURE 14 is a view taken on the line 14—14 of FIGURE 13.
Figure 13:
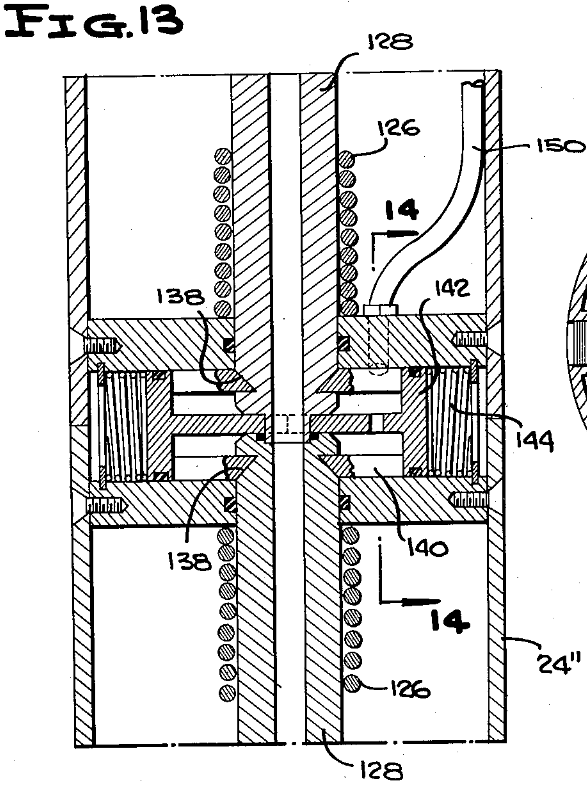
FIGURE 13 is a view taken on the line 13—13 of FIGURE 12.
Figure 15:
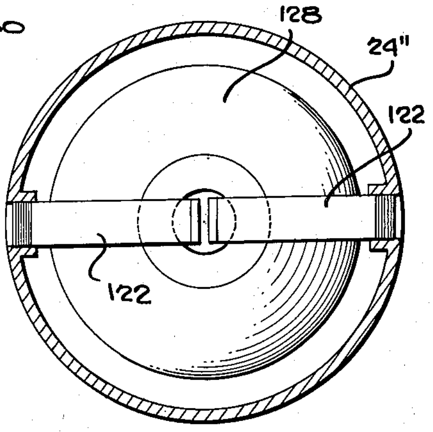
FIGURE 15 is a view on an enlarged scale, taken on the line 15—15 of FIGURE 10.

The present invention provides releasable latch means operatively connected to the operator or wedge element 128 for holding the latter in the loaded position. This latch means is seen in FIGURES 12 to 14.

As shown in FIGURE 10, there are two operator or wedge elements 128 arranged in axial alignment with their free ends remote from each other. As shown in FIGURES 12 and 13, the confronting ends of the elements 128 are provided with notches 138 in which are normally seated dogs 140 which are carried on pistons 142.

The pistons 142, arranged in opposed relation on each side of the elements 128, are biased inwardly by springs 144 and are slidable within a bore 146 provided in a partition 148 which subdivides the cylinder 24″ into upper and lower sections.

A conduit 150 has one end connected in communication with the bore 146 and has its other end, as shown in FIGURE 10, exteriorly of the cylinder 24″ and adapted to be connected to a source of hydraulic or pneumatic pressure such as the pump chamber 56 and piston 58 in the tool 48.

With reference to the form of the invention shown in FIGURES 16 to 20, inclusive, the cylinder 24‴ is provided with an operator element 152 carrying prong elements 26′ and 28′. The cylinder 24‴ is split into sections, here shown as three in number, although it may be divided into as many sections as is found practical. The sections of the cylinder 24‴ are expandable outwardly from the full line position shown in FIGURE 19 to the dotted line position in response to longitudinal movement of the operator element 152.

Figures 16, 17, 18, 19, 20:
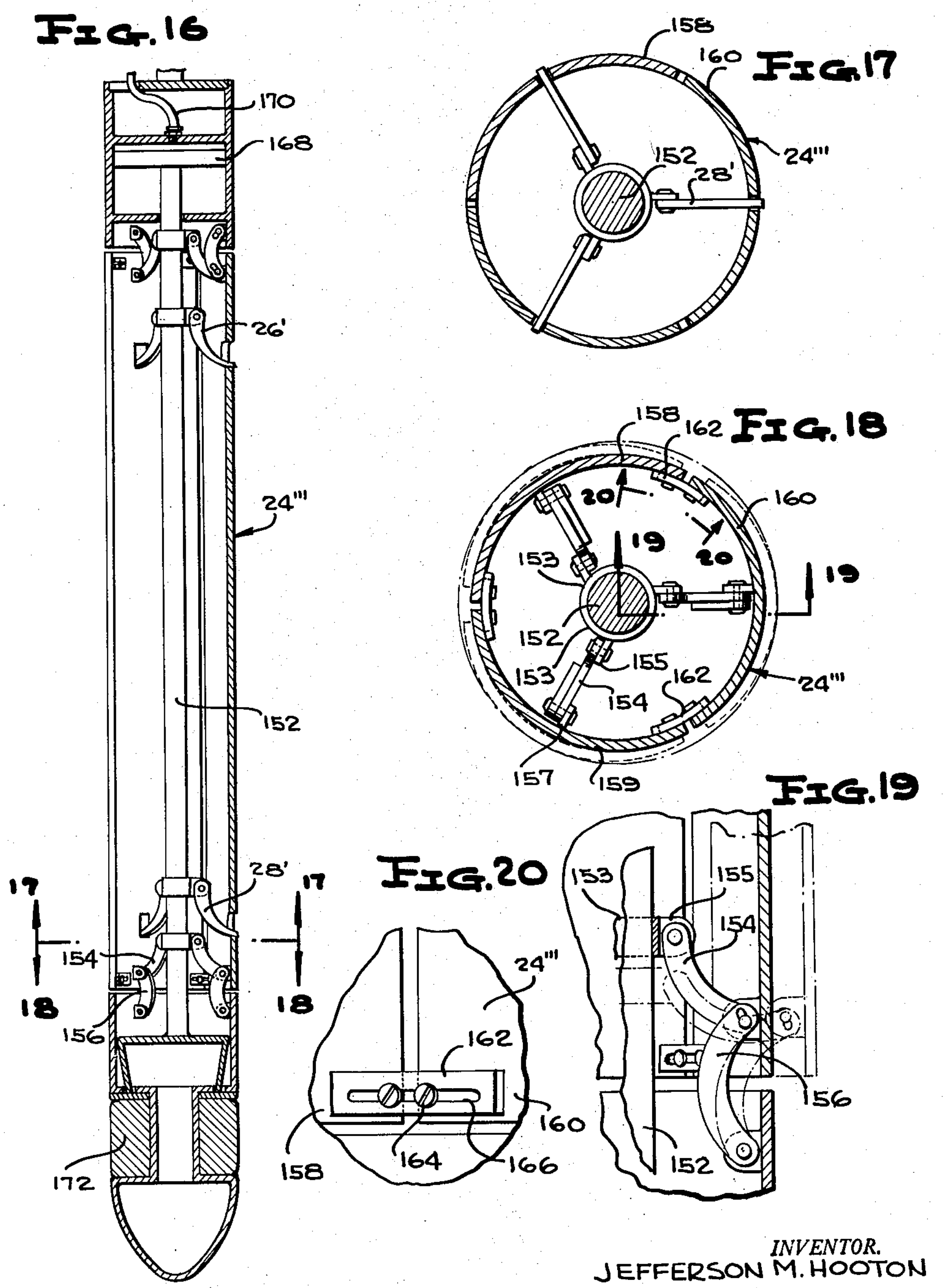
FIGURE 16 is a sectional view of a still further modified form of the device according to the present invention.
FIGURE 17 is a view on an enlarged scale, taken on the line 17—17 of FIGURE 16.
FIGURE 18 is a view taken on the line 18—18 of FIGURE 16, on an enlarged scale.
FIGURE 19 is a view taken on the line 19—19 of FIGURE 18.
FIGURE 20 is a view on an enlarged scale, taken on the line 20—20 of FIGURE 18.

As shown in FIGURE 20, the sections of the cylinder 24‴, designated by the numerals 158, 159, and 160 in this figure, are secured for sliding movement relative to each other by an arcuately curved bar 162 with suitable cap screws 164 extending through a slot 166 formed in the bar 162.

The upper end of the operator element 152 carries a piston 168 slidable within the closed chamber which is connected by a conduit 170 to a source of either pneumatic or hydraulic fluid under pressure such as was described with the form of the invention shown in FIGURES 1 to 7, inclusive.

A sleeve 153 is frictonally engaged on the element 152 and a plurality of spaced link elements 154 have their one ends pivotally connected to lugs 155 projecting from the sleeve 153. Each link element 154 has its other end pivotally connected to one end of another link element 156. The other end of each link element 156 is pivotally connected to a lug 157 carried by the inner face of the adjacent section of the cylinder 24‴, as shown in FIGURE 18.

When the operator element 152 is shifted downwardly in response to downward travel of the piston 168, the cylinder sections first engage the well bore and the sleeve 153 then slides on the element 152, permitting further downward movement of the element 152 until the prong elements 26′, 28′ are anchored in the well bore.

In this form of the invention, another collar 172 is positioned on the lower end of the cylinder 24‴ and is expanded outwardly by the action of the element 152 when the latter moves downwardly.

The collars 40, 76, 136, and 172 are formed of resilient material such as rubber or the like. If desired, a feature, using cement, may be incorporated if it is deemed necessary to further seal and secure the tool within the well bore. A retarded cement slurry, with fill-up ports covered with a rupture-type seal, may be substituted for the collars 40, 76, 136 and 172. In this case, instead of expansion of such collars formed of rubber, the rupture-type seals of the cement slurry would be broken and the cement forced into engagement with the well bore 30.

In operation, with reference to the form of the invention shown in FIGURES 1 to 7, the upper end of a setting tool 48 is secured to the lower end of the circulating sub tool 70 and the lower end of the setting tool 48 is connected by the connector 50 to the upper end of the body 22. The upper end of the circulating sub tool 70 is next connected to the lower end of the drill pipe 176 and the assembly is lowered into the well bore 30 to the position in which the cylinder 24 is to be anchored in the well bore.

An operating device 72, commonly termed a "go-devil" in the industry, is now inserted into a drill pipe 176 at the ground surface and permitted to fall through the drill pipe 176 through the upper end of the sub tool 70. The device 72 carries rubber guide fins 73 inward, inwardly of each end, and a "pack-off" or seal means 75 between the fins 73. The seal means 75 closes the bore 71 of the sub tool 70 above the circulation holes 69 provided therein which bent the bore 71.

Next, at the ground surface, a pump is attached to the upper end of the drill pipe 176 and fluid pressure is applied to the interior of the drill pipe 176. This pressure forces the "go-devil" or device 72 to move downwardly, contact the upper end of the rod 60, and against the compression of the spring 62, force the piston 58 downwardly. When the seal means 75 passes the hole 69, pressure is released and the piston 58 and device 72 are returned to the original position by the action of the spring 62.

Continued pressure in the drill pipe 176 causes the device 72 to repeat the cyclic up and down movement, resulting in forcing of the fluid from the reservoir 64 into the chamber 36 on the upper end of the piston 34. As the pressure increases in the chamber 36, the piston 34 is forced downwardly, resulting in projecting the prong elements 26 and 28 outwardly of the cylinder 24 and into engagement with the walls of the well bore 30. The prong elements 26 and 28 are connected by a pivot pin 174 to the element 32 for swinging movement about a horizontal axis.

With reference to the form of the invention shown in FIGURES 8 and 9, the setting tool 48' is substituted for the tool 48. In the tool 48' is the cylinder 49 supporting the sleeve 118, batteries 106, and the mechanism of the previously described switch. After the assembly of the tool 48' and sub tool 70 on the drill pipe 176, the assembly is dropped into the well bore 30 to the position in which the cylinder 24' is to be anchored. Upon dropping of the "go-devil" device 72, the impact of the device 72 on the closed end 120 of the sleeve 118 effects the closing of the switch mechanism and detonates the explosive material 98. The gas pressure induced by the burning or explosion of the material 98 forces the piston 34 downwardly and effects the downward movement of the element 32 with subsequent locking of the lock means in the wall of the well bore. If the impact of the device 72 on the upper end of the sleeve 118 is not sufficient to close the switch mechanism, pressure may be applied to the previously described means of operating the device 72 in the form of the invention shown and described with reference to FIGURES 1 to 7, inclusive.

With reference to the form of the invention shown in FIGURES 10 and 11, the cylinder 24'' is inserted into the well as heretofore described with reference to the form of the invention shown in FIGURES 1 to 7, and when so positioned, the cylinder 24'' is permanently anchored in the well bore by the application of either hydraulic or gas pressure introduced into the upper end of the conduit 150.

When pressure is introduced into the bore 146 in the partition 148 through the conduit 150, the pistons 142 are driven outwardly. This results in the dogs 140 being released from the notches 138 and subsequent expansion of the spring 126 to drive the wedge element 128 into engagement with the strap members 130 to force the prong elements 122 outwardly into anchoring engagement in the well of the bore.

It is to be understood that the split cylinder 24''' may be employed with each of the above described embodiments of the invention, whether gas pressure is used to drive or release the prong elements, or whether hydraulic pressure is used or the loaded springs 126 are used.

After the cylinder 24, 24', 24'', or 24''', has been positioned in the well where it is to be anchored, which is determined at the ground surface by the use of a conventional weight indicator (not shown), the weight of the drill pipe 176 is placed upon the assembly within the well bore 30 and the respective connector 50 or 50', constituting a shear pin, is sheared where it is connected to the upper end portion of the whipstock or body 22, 22'.

After the connector 50, 50' has been sheared, everything above the connector is retrieved when the drill pipe 176 is pulled from the bore 30.

With the body 22, 22' or the respective cylinder 24, 24', 24'', 24''', now anchored in the well bore 30, drilling may be resumed within the well in a new bore to one side of the whipstock or body 22, 22' by the insertion into the bore the conventional drill bit 180 on the lower end of a drill rod 182. The tapered face of the whipstock or body 22, 22' will deflect the bit 180 to form another bore diverging away from the bore 30, as shown in FIGURE 2.

In order to tilt the body 22, 22' against the wall of the well bore so that when the drill bit 180 is lowered on the drill rod 182, it will slide off of the tapered face of the body 22, a spring 178, normally held in compressed condition between the lower end of the body 22, 22' and the upper end of the respective cylinder, is released and the body 22 is tilted so that its upper end bears against the wall of the well bore, as shown in FIGURE 2.

While the actuating means or operator element is shown to have a downward movement when projecting the prong elements outwardly, it is to be understood that the force supplying means may be so located as to effect movement of the operator element upwardly, if desired.

What is claimed is:

1. A well device comprising an upstanding elongated tapered body, an elongated cylinder positioned below and in vertical alignment with respect to said body and dependingly supported from said body, expandable locking means mounted in said cylinder and arranged to swing outwardly into locking position, said means being normally in a retracted position, an elongated actuator disposed longitudinally of and within said cylinder and pivotally connected to said expandable locking means and operable to expand the locking means to locking position, a resilient collar circumposed about and carried by said cylinder and spaced from said locking means, abutment means projecting transversely from said actuator and slidable along said cylinder, said device being insertable into a well bore which may be wholly devoid of well fluid or may contain well fluid and which is to be closed, and a means in fluid communication with said actuator whereby fluid under pressure can be applied to actuate same and expand the locking means to the locking position and forcibly impose said abutment means upon said collar to thereby fixedly anchor said device in said well bore.

2. A well device comprising an upstanding elongated tapered body, an elongated cylinder positioned below and in vertical alignment with respect to said body and dependingly supported from said body, expandable locking means mounted in said cylinder and arranged to swing outwardly into locking position, said means being normally in the retracted position, an elongated actuator disposed longitudinally of and within said cylinder and pivotally connected to said expandable locking means and operable to expand the locking means to locking position, a resilient collar circumposed about and carried by said cylinder and spaced from said locking means, a plurality of pins projecting transversely from said actuator and slidable in longitudinal slots provided in said cylinder, said device being insertable into a well bore which may be wholly devoid of well fluid or may contain well fluid and which is to be closed, gas generating means carried by said device, means to ignite said gas generating means, and means connecting said gas generating means to said actuator whereby the gas generated can be imposed on said actuator to actuate same and expand the locking means to the locking position and forcibly impose said pins upon said collar to thereby fixedly anchor said device in said well bore.

3. A well device comprising an upstanding elongated tapered body, an elongated cylinder positioned below and in vertical alignment with respect to said body and dependingly supported from said body, expandable locking means mounted in said cylinder and arranged to swing outwardly into locking position, said means being normally in a retracted position, an elongated actuator disposed longitudinally of and within said cylinder and pivotally connected to said expandible locking means and operable to expand the locking means to locking position, a piston on the upper end of said actuator, a closed chamber encompassing said piston, a resilient collar circumposed about and carried by said cylinder and located between said chamber and said locking means, a plurality of pins projecting transversely from said actuator and slidable in the longitudinal slots provided in said cylinder, said device being insertable into a well bore which may be wholly devoid of well fluid or may contain well fluid and which is to be closed, gas generating means carried by said device, means to ignite said gas generating means, and means connecting said gas generating means to said actuator whereby the gas generated can be injected under pressure into said chamber so as to impose a driving force upon said piston to actuate the actuator and expand the locking means to locking position and forcibly impose said pins upon said collar to thereby fixedly anchor said device in said well bore.

References Cited in the file of this patent

UNITED STATES PATENTS

| | | |
|---|---|---|
| 2,189,937 | Broyles | Feb. 13, 1940 |
| 2,209,627 | Miller | July 30, 1940 |
| 2,227,347 | Johnson | Dec. 31, 1940 |
| 2,506,799 | Livingston | May 9, 1950 |
| 2,904,112 | Wiley | Sept. 15, 1959 |